Oct. 8, 1968  S. GOLDMAN  3,404,438

FASTENING ASSEMBLY FOR USE WITH A CARGO RETAINING BELT

Filed Nov. 20, 1967  2 Sheets-Sheet 1

Oct. 8, 1968  S. GOLDMAN  3,404,438
FASTENING ASSEMBLY FOR USE WITH A CARGO RETAINING BELT
Filed Nov. 20, 1967  2 Sheets-Sheet 2
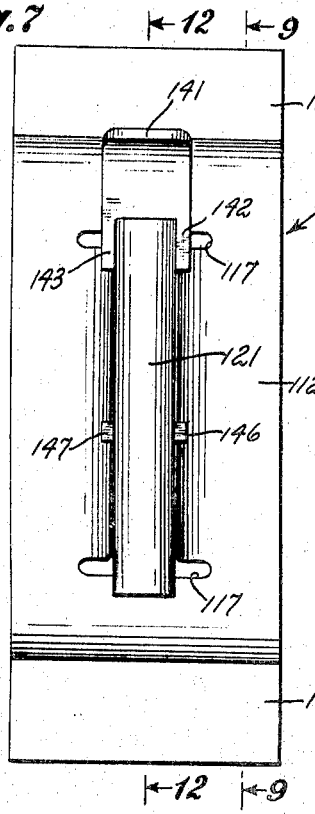
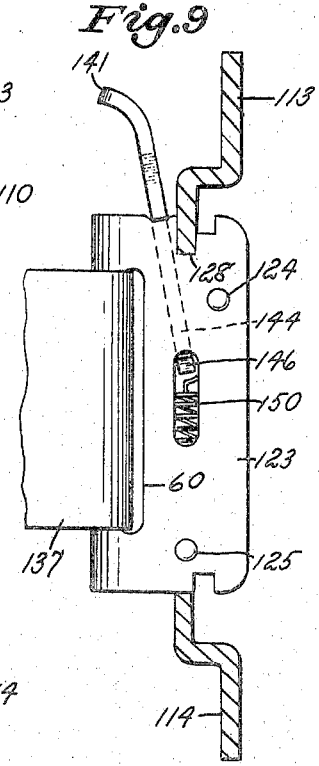
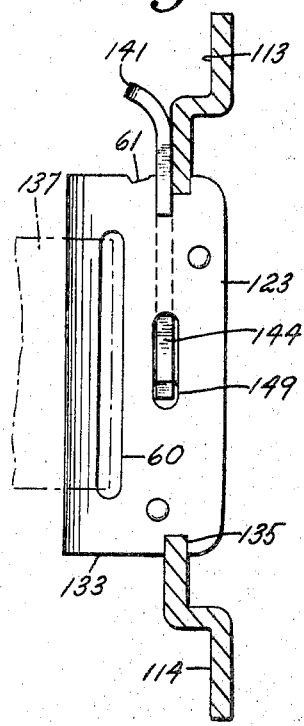
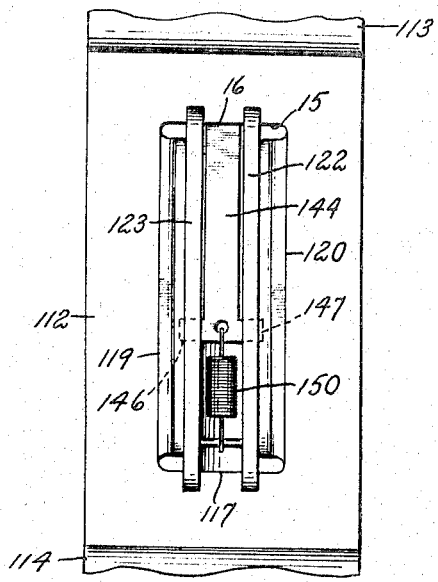
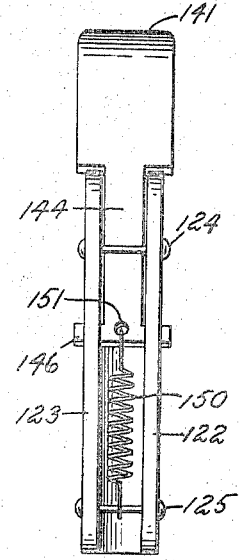
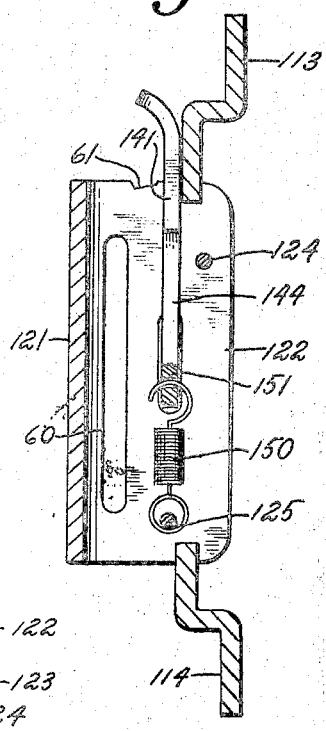
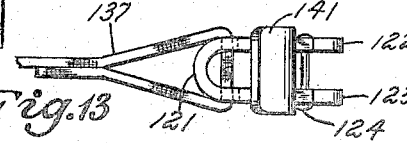

United States Patent Office 3,404,438
Patented Oct. 8, 1968

3,404,438
FASTENING ASSEMBLY FOR USE WITH A CARGO-RETAINING BELT
Sam Goldman, Riverdale, N.Y.
(120 Freeman St., Brooklyn, N.Y. 11222)
Filed Nov. 20, 1967, Ser. No. 684,458
3 Claims. (Cl. 24—201)

ABSTRACT OF THE DISCLOSURE

A fastening assembly for use with a cargo retaining belt consisting of a track with rectangular opening, and a bolt with length longer than the said opening. By lifting a T-shaped member to an upper position, the track and bolt can be interfitted by placing the upper inner edge of the track opening in a notch in the bolt to enable the same to swing into place unobstructed. Once in place, the T-shaped member may be placed back in its original position to lock the track and bolt together.

---

This invention relates generally to the field of fasteners, and more particularly to a fastener of the type wherein a female element, sometimes referred to as a track, is removably connected with a complementary male element, or bolt, received in an opening in the former. Such fasteners may be used in conjunction with web or other straps to hold cargo in place on trucks or railroad cars, or to hold several elements of cargo together.

The general object of my invention is to provide an improved fastener with the character set forth which is relatively fool proof and will not disengage prematurely due to any stresses or impacts that may occur due to transport of goods by truck or rail.

A related object is to provide a stronger fastener than now available by eliminating areas of unequal stresses.

A further object is to provide a fastener in which there is no contact between the cloth straps used for securing cargo and the metallic track which might normally cause wear and decrease the useful life of such straps.

A more particular object is to increase the flexibility of the fastener by the use of a ringed connector which would prevent excessive wear on the strap when cargo must be held at angles other than perpendicular to the track base, which would again decrease the useful life of such straps.

These objects, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIGURE 7 is a front view of a second embodiment of the invention in engaged condition.

FIGURE 8 is a rear view of the second embodiment showing the side opposite that seen in FIGURE 7.

FIGURE 9 is a cross sectional view, partly in elevation as seen from the plane 9—9 in FIGURE 7.

FIGURE 10 is a similar cross sectional view, showing one of the component parts removed for purposes of clarity and showing certain of the component parts in altered relative position.

FIGURE 11 is a rear elevational view corresponding to the right hand portion of FIGURE 9.

FIGURE 12 is a longitudinal sectional view corresponding to that seen from the plane 12—12 in FIGURE 7, with one of the component parts removed.

FIGURE 13 is a top plan view as seen from the upper portion of FIGURE 10.

Figure 1:
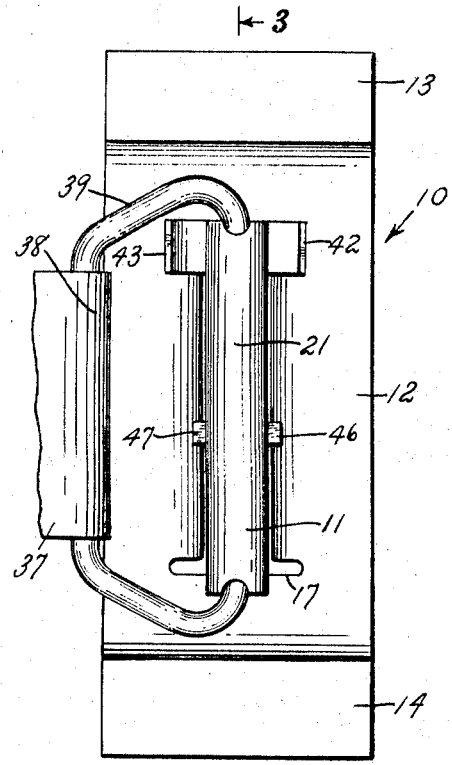
FIGURE 1 is a front view of an embodiment of the invention in engaged condition.
Figure 3:
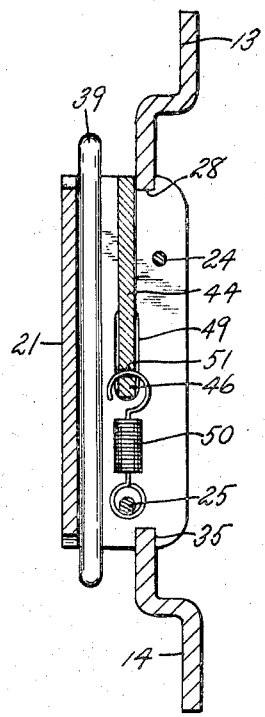
FIGURE 3 is a cross sectional view thereof as seen from the plane 3—3 in FIGURE 1.

In accordance with the first embodiment of the invention, the device comprises broadly: a track element 10 and a bolt element 11.

The element 10 is essentially rectangular, with a bolt engaging member 12 and two mounting members 13 and 14 at opposite ends thereof with surfaces parallel to but on a lower plane with respect to member 12. Said member 12 has an opening 15 therein bounded by an upper edge 16, lower edge 17, and side cam members 18 and 19; said members 18 and 19 bend downward to form together with edges 16 and 17 a guiding means for proper engagement of bolt element 11. Track element 10 may be secured by conventional means, e.g. by rivets (not shown) through said mounting portions 13 and 14 to the body of vehicle, such as a truck or railway car (not shown).

The element 11 comprises, in part, the rectangular metallic plate 20 having a substantially U-shaped cross-section forming a rounded portion 21 and two side portions 22 and 23, joined by pintles 24 and 25. Located at the upper end 26 of said side portions 22 and 23 are a pair of stepped notches 27 and 28, each including a relatively deep notched portion 29 and a relatively shallow notched portion 30, the lower edges of said notches being indicated by reference characters 31 and 32, respectively. At the lower end 33 of said side portions 22 and 23 are a pair of relatively shallow notches 34 and 35 respectively, having upper edges 36.

The element 11 is attached to a strap 37 by means of a segment 38 thereof looped around a ringed connector 39 held in place by portion 21, pintle 25, in T-shaped latch member 40. The member 40 includes an upper portion 41, slightly curved at extremities 42 and 43 thereof for convenient manual handling, a shank 44, and a base 45 with projections 46 and 47 at the extremities thereof to enable the latch 40 to glide in the apertures 48 and 49 in portions 22 and 23 respectively. The member 40 when in a first position before any engagement of the bolt element 11 with the track element 10 is held resiliently in the deep notch portion 29 by a tensed spring 50 connected to the latch 40 at aperture 51 and to the bolt element 11 by the pintle 25.

Figure 4:
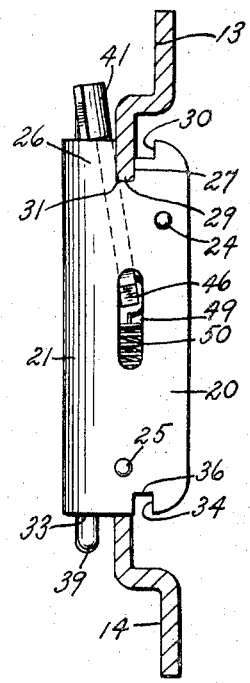
FIGURE 4 is a side elevational view showing the embodiment in particularly disengaged condition.
Figure 2:
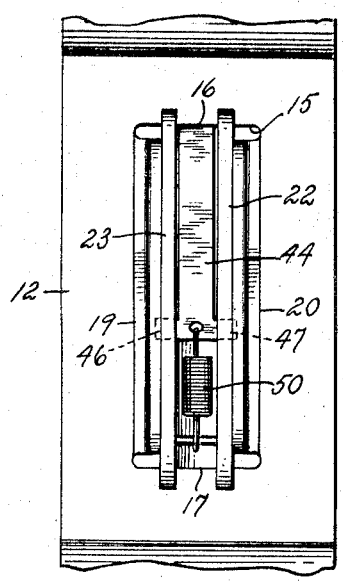
FIGURE 2 is a rear view thereof of the embodiment showing the side opposite that seen in FIGURE 1.
Figure 6:
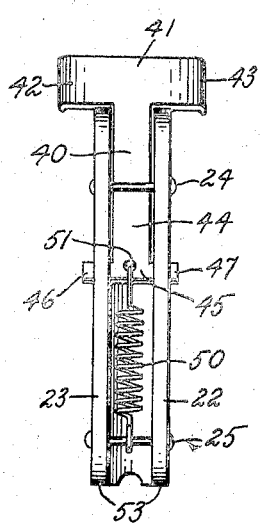
FIGURE 6 is a rear view of one element of the device in disengaged condition.

In a second disengaged position as shown best in FIGURE 4 the latch member 40 is raised so that the upper parts 41 thereof rest on the upper edge 52 of side portions 22 and 23. The edge 16 of track element 10 may then be placed in the notched portion 29 so that it is possible for the lower edge 17 to pass the lower corner 53 of side portions 22 and 23 and be placed in engaged position as shown in FIGURE 5 with edge 16 in notched portion 30 and edge 17 in notches 34 and 35.

Figure 5:
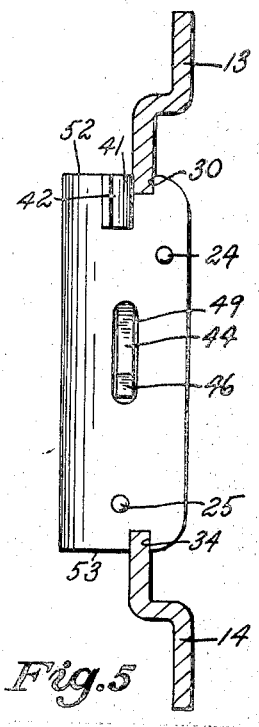
FIGURE 5 is a side elevational view thereof showing the same in engaged condition.

The bolt element 11 may be locked in the track element 10 by returning the latch member 40 to its initial position as shown in FIGURE 5 which will prevent premature disengagement of elements 10 and 11.

Turning now to the second embodiment of the invention, as illustrated in FIGURES 7 to 13, inclusive, parts corresponding to those of the first embodiment have been designated by similar deference characters, with the additional prefix "1," thus avoiding needless repetition.

The second embodiment differs from the first embodiment in the elimination of members 39, and the threading of the strap 137 through a pair of slots 60 in the members 120 and 122, as best seen in FIGURE 13. A pair of angularly shaped recesses 61 are provided to engage the members 142 and 143 in the position shown in FIGURE 9, and prevent accidental dislodgment until required.

I wish it to be understood that I do not consider the invention limited to the present details of structure shown and set forth herein, for obvious modifications will occur to those skilled in the art to which the invention pertains.

I claim:

1. A fastening assembly for use with a cargo retaining belt comprising: a track element, and a bolt element selectively engageable therewith; said track element being of generally rectangular configuration having mounting surfaces at each longitudinal extremities thereof and a centrally disposed bolt engaging portion, the plane of which is parallel to said mounting surfaces; there being an opening within said central portion with means for guiding said bolt element to engage therewith; said bolt element including a metallic plate having a substantially U-shaped cross section; said bolt element having a first pair of notches at a first end thereof, including stepped notched portions, a second pair of notches at an opposite end thereof, and a pair of apertures in a central portion thereof; said bolt element including a latch member having a first manually engageable end, a shank portion, and a base portion having projections at an end thereof which enables the latch to slide in said apertures found in the bolt element; whereby, when said latch element is lifted to an upper position, by placing upper inner edge of the track opening in the deeper portions of the stepped notch, the bolt element may swing into place unobstructed, and once engaged whereby said upper inner edge of said track opening is in the shallow portion of said pair of stepped notches and the lower inner edge of the track opening is in said pair of second notches of the bolt element, said latch may be placed back in the deeper portions of said pair of stepped notches to lock the track and bolt together.

2. Structure in accordance with claim 1 whereby said latch is urged into place by a tensed spring attached to same.

3. Structure in accordance with claim 1 including said track element with guiding means for bolt element engagement, wherein the longitudinal inner parallel edges slant downward relative to the bolt engaging surface.

References Cited
UNITED STATES PATENTS 2,984,885   5/1961   Elsner.
3,323,186   6/1967   Rennert.

BERNARD A. GELAK, *Primary Examiner.*